Patented Dec. 15, 1953

2,662,902

UNITED STATES PATENT OFFICE 2,662,902

CHLOROMETHYLATED ARYLAMINO-ANTHRAQUINONES

David I. Randall, Easton, Pa., and Edgar E. Renfrew, Phillipsburg, N. J., assignors to General Aniline & Film Corporation, New York, N. Y., a corporation of Delaware No Drawing. Application February 10, 1950, Serial No. 143,598

10 Claims. (Cl. 260—380)

1

This invention relates to novel chloromethylated derivatives of arylaminoanthraquinones, and to a process for their preparation.

Chloromethylation of aromatic compounds, carried out, for example, by reaction of the intermediate aromatic compound with bis-chloromethyl ether, or equivalent chloromethylating reagents, is well known. In the case of aromatic primary and secondary amines, reaction with chloromethylating reagents was observed to proceed readily, but it was not possible to recover simple nuclear chloromethyl-substituted derivatives of the parent amines. This was ascribed to the highly reactive nature of the chloromethyl groups which presumably underwent further reaction with the primary and secondary amino groups.

We have discovered that arylaminoanthraquinones, especially those in which the aryl radical of the arylamino group is a monocyclic radical of the benzene series, having at least one reactive nuclear position of the arylamino group unoccupied, react with bis-chloromethyl ether or equivalent chloromethylating reagents, in an acidic condensing medium, to yield derivatives in which a chloromethyl group or groups are present as nuclear substituents in the arylamino groups. It has been found that the chloromethyl groups do not enter the anthraquinone nucleus and do not condense with any amino group that might be present in the molecule. Chloromethyl-substituted derivatives of the parent compounds are obtained in sufficiently pure form to be used as intermediates for dyestuff preparation, e. g. by conversion to the corresponding quaternary nitrogen base salts or isothiouronium salts of our copending application Serial No. 143,599, filed of even date herewith, such salts constituting valuable dyestuffs for textile materials, especially cellulosic materials.

It is accordingly an object of this invention to provide novel chloromethyl-substituted derivatives of arylaminoanthraquinone compounds, wherein the chloromethyl groups occupy nuclear positions in the arylamino radicals, and to provide a process for the preparation of these compounds.

In preparing the chloromethylated derivatives of this invention, bis-chloromethyl ether is added to a solution of an arylaminoanthraquinone compound in concentrated (e. g. at least 95%) sulfuric acid. The reaction mixture is stirred at moderate temperatures, e. g. from 0 to 65° C. The reaction product can be recovered by drowning the mixture in ice water, and filtering out

2 and washing the insoluble product thereby precipitated.

An excess of bis-chloromethyl ether is generally employed, preferably at least 2 moles per mole of anthraquinone compound.

The number of chloromethyl groups introduced into each arylamino group depends on the number, position and nature of substituents already present, and on the reaction conditions such as temperature, concentration and duration. Ordinarily, one chloromethyl group is introduced in meta position to the anthraquinonylamino group if this position is unoccupied; and in some cases, two chloromethyl groups are introduced, e. g. in the case α-p-toluidinoanthraquinone, two chloromethyl groups occupying positions ortho to the methyl group.

The aryl radicals of the 1-arylamino groups which undergo chloromethylation can be mono- or polycyclic, e. g. of the benzene, biphenyl, diphenyl methane, anthracene, phenanthrene or naphthalene series, but are a monocyclic aryl derivatives. They can be substituted in one or more nuclear positions by substituents which are unreactive toward the chloromethylating agent under the conditions of chloromethylation, provided that at least one reactive position remains unoccupied. Suitable unreactive substituents are, for example, lower alkyl (e. g. methyl, ethyl) groups, halogen (e. g. chlorine, bromine) nitro. Reactive positions in the nucleus of the arylamino radical are determined by the position of the anthraquinonylamino group and of other substituents present therein, including, for example, the position meta to the anthraquinonyl-amino group, and ortho to halogen or a lower alkyl group. The arylamino group may be present in either the α- or β-position of the anthraquinone group.

Arylamino groups of the aforesaid type may occupy one or more of the positions of the anthraquinone nucleus in the compounds subjected to chloromethylation. When more than one such arylamino radical is present, chloromethylation occurs in each of said radicals.

The anthraquinone radical of the compounds employed as starting materials can be free of substituents other than the arylamino groups, or can contain additional substituents such as hydroxyl, primary amino, or alkylamino (e. g. methylamino, ethylamino, hydroxyethylamino) groups. Surprisingly, such substituents, which might have been expected to react either with the chloromethylating agent or with the nuclear chloromethyl derivatives obtained, do not interfere with aryl chloromethylation. α- and/or β-positions of the anthraquinone nucleus can contain substituents such as lower alkyl (e. g. methyl, ethyl) groups, lower alkoxy (e. g. methoxy, ethoxy) groups, or halogen (chlorine, bromine), which are unreactive under the conditions of chloromethylation. Unreactive substituents of this type further include sulfonic acid and carboxylic acid groups, but the compounds employed as starting materials preferably do not contain salt-forming groups of this kind (i. e., acidic water-solubilizing groups) which tend to render the compounds soluble in aqueous alkaline media.

The novel compounds of this invention are accordingly nuclear chloromethyl-substituted arylaminoanthraquinones, preferably monocyclic-arylaminoanthraquinones, in which each chloromethyl group occupies a nuclear position of an arylamino radical, and are especially such compounds in which other substituents, if present, are of the class consisting of hydroxyl, primary amino, alkylamino, lower alkyl, lower alkoxy groups and halogen, and the remaining nuclear positions, if substituted, contain unreactive substituents such as lower alkyl, lower alkoxy groups or halogen.

Our invention will be more fully understood from the following examples illustrating preferred embodiments of the invention, wherein parts and percentages are by weight unless otherwise expressed.

*Example 1*

94 parts of 1-p-toluidinoanthraquinone were dissolved in 920 parts of 99.3% sulfuric acid, and 115 parts of bis-chloromethyl ether were added to the solution. The reaction mixture was stirred for 6 hours at a temperature of 28 to 30° C., and then poured, with agitation, into 10,000 parts of a mixture of ice and water. The solid thereby precipitated was separated by filtration, and washed with water until the washings were neutral. The filter cake was then dried at 75° C., yielding 115 parts of a product containing 15.2% Cl (calculated for the derivative containing 2 chloromethyl groups: $C_{23}H_{17}O_3NCl_2$; Cl=17.3%). The product was therefore essentially 1-(bis-chloromethyl-p-toluidino)-anthraquinone.

*Example 2*

1270 parts of bis-chloromethyl ether were added in 4 portions, at ½-hour intervals, to 3700 parts of 99.6% sulfuric acid, with good agitation. 436 parts of 1-anilino-4-hydroxyanthraquinone were gradually added concurrently with the bis-chloromethyl ether, over a period of 2 hours, to the resulting solution, maintained at 30 to 32° C. The reaction was allowed to continue for an additional hour, and the mixture then poured into 20,000 parts of a mixture of ice and water. The product thereby precipitated was filtered out, washed with water until the washings were neutral, and dried. 474 parts of a product were obtained containing 9.2% Cl (calculated for the derivative containing 1 chloromethyl group: $C_{21}H_{14}O_3NCl$; Cl=9.8%) The product was thus essentially 1-(monochloromethylanilino)-4-hydroxyanthraquinone.

*Example 3*

115 parts of bis-chloromethyl ether were slowly added to a solution of 158 parts of 1-hydroxy-4-p-toluidinoanthraquinone in 1840 parts of 98.4% sulfuric acid. The solution was stirred for 8 hours at 28 to 30° C., and then poured into 10,000 parts of a mixture of ice and water. The precipitated solid was collected on a filter and washed with water, as in the preceding examples. On drying, 177 parts of a product were obtained containing 6.9% Cl (calculated for the derivative containing 1 chloromethyl group: $C_{22}H_{16}O_3NCl$; Cl=9.3%). The product was thus composed mainly of 4-(monochloromethyl-p-toluidino)-1-hydroxyanthraquinone. Upon reaction with pyridine, the chloromethylated derivative forms a quaternary pyridonium salt which is soluble in water, and which can be separated from unreacted 1-hydroxy-4-p-toluidinoanthraquinone by slurrying with water, and filtering out the unreacted parent anthraquinone compound.

*Example 4*

104 parts of bis-chloromethyl ether were added to a solution of 125 parts of 1,4-di-p-toluidinoanthraquinone in 1840 parts of 98.6% sulfuric acid over a period of 20 minutes. The mixture was stirred for 6 hours at temperatures from 25 to 30° C., and then poured into 10,000 parts of a mixture of ice and water. The solid thereby precipitated was collected on a filter and washed as described in the preceding examples. After drying, 165 parts of a product were obtained containing 11.7% Cl, calculated for the derivative containing 2 chloromethyl groups:

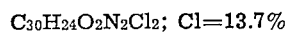
$C_{30}H_{24}O_2N_2Cl_2$; Cl=13.7%

The product thus consisted mainly of 1,4-bis-(monochloromethyl-p-toluidino)-anthraquinone.

*Example 5*

115 parts of bis-chloromethyl ether were added slowly to a solution of 125 parts of 1,5-di-p-toluidinoanthraquinone in 1840 parts of 98.7% sulfuric acid. The mixture was agitated for 5 hours without heating, at 25 to 30° C. The mixture was then drowned in 10,000 parts of a mixture of ice and water, and the precipitated product collected on a filter. It was washed free of acid with water, and on drying was found to consist of 169 parts of a product containing 15.6 Cl (calculated for the derivative containing 2 chloromethyl groups: $C_{30}H_{24}O_2N_2Cl_2$; Cl=13.7%). The product thus consisted essentially of 1,5-bis-(monochloromethyl-p-toluidino)-anthraquinone.

*Example 6*

230 parts of bis-chloromethyl ether were slowly added to a solution of 171 parts of 1-methylamino-4-p-toluidinoanthraquinone in 1840 parts of 98.4% sulfuric acid. The mixture was stirred 24 hours at ordinary temperatures, and then poured into 10,000 parts of a mixture of ice and water. On filtering and washing the filter cake until free of acid, and drying the filter cake at 60° C., 204 parts of a product were obtained containing 9.3% Cl, calculated for the derivative containing 1 chloromethyl group:

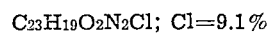
$C_{23}H_{19}O_2N_2Cl$; Cl=9.1%

The product was thus essentially 1-methylamino-4-(monochloromethyl-p-toluidino)-anthraquinone.

*Example 7*

203 parts of 1-amino-2-bromo-4-p-toluidinoanthraquinone were added portionwise to a solution of 172.5 parts of bis-chloromethyl ether in 1840 parts of 99.6% sulfuric acid. The mixture was stirred for 3 hours at a temperature of 28° C., and then drowned in a mixture of ice and water as in the preceding examples. On filtering, washing the filter cake until neutral, and drying, 246 parts of a product were obtained containing 12.1% total halogen (calculated as Cl). (Total halogen calculated as Cl for the derivative containing 1 chloromethyl group:

$C_{22}H_{16}O_2N_2BrCl$, 15.6%)

The product was thus essentially composed of 1-amino-2-bromo-4-(monochloromethyl-p-toluidino)-anthraquinone.

The fact that the chloromethyl groups do not enter the anthraquinone nucleus in the foregoing reactions is shown by the fact that 1-methylaminoanthraquinone does not react with bis-chloromethyl ether under the conditions of the foregoing examples to form a nuclear chloromethyl derivative.

The chloromethylated arylaminoanthraquinones of this invention react with tertiary amines such as pyridine or trimethylamine to form quaternary nitrogen base salts which are soluble in water and which constitute dyestuffs for printing cotton and silk. Similar reaction of the products of this invention with thiourea or its N-alkyl or aryl substitution products yields isothiouronium salts which are likewise soluble in water, and similarly useful for dyeing and printing textiles. The products of the invention also react with phenols such as resorcinol to form the corresponding phenol ethers, which are valuable as spirit-soluble dyestuffs.

Instead of the arylaminoanthraquinone compounds serving as starting materials in the foregoing examples, corresponding arylamino compounds can be employed in which the anilino and p-toluidino radicals of said compounds are replaced by m-xylidino, p-chloroanilino, p-anisidino, α- or β-naphthylamino, p-benzylanilino, or p-phenyl-anilino radicals. In each case, chloromethyl derivatives of the parent compounds are obtained in which the chloromethyl groups occupy nuclear positions of the α-arylamino radicals.

Variations and modifications which will be obvious to those skilled in the art can be made in the foregoing procedures hereinbefore specifically described, without departing from the scope or spirit of the invention.

We claim:

1. An anthraquinone compound having the following general formula

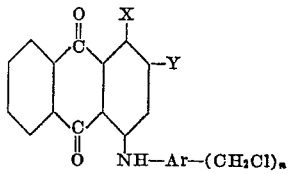

wherein X represents a member of the group consisting of H, hydroxyl, amino, and methylamino groups, Y represents a member of the group consisting of hydrogen and bromine, and Ar represents a monocyclic aryl hydrocarbon radical in which the —NH— and —CH₂Cl radicals are nuclear substituents, and n represents an integer from 1 to 2.

2. A process for the preparation of a chloromethylated anthraquinone compound which comprises reacting bis-chloromethyl ether in concentrated sulfuric acid at 0° to 65° C. with an anthraquinone compound having the following formula

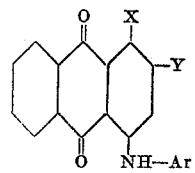

wherein X represents a member of the group consisting of H, hydroxyl, amino, and methylamino groups, Y represents a member of the group consisting of hydrogen and bromine, and Ar is a monocyclic aryl hydrocarbon radical in which the —NH— occupies a nuclear position.

3. 1-(bis-chloromethyl-p-toluidino)-anthraquinone.

4. 4-(monochloromethyl-anilino)-1-hydroxyanthraquinone.

5. 1-methylamino-4-(monochloromethyl-p-toluidino)-anthraquinone.

6. 1-amino-2-bromo-4-(monochloromethyl-p-toluidino)-anthraquinone.

7. A process as defined in claim 2, wherein said arylaminoanthraquinone compound is 1-p-toluidinoanthraquinone.

8. A process as defined in claim 2, wherein said arylaminoanthraquinone compound is 1-hydroxy-4-anilinoanthraquinone.

9. A process as defined in claim 2, wherein said arylaminoanthraquinone compound is 1-methylamino-4-p-toluidinoanthraquinone.

10. A process as defined in claim 2, wherein said α-arylaminoanthraquinone compound is 1-amino-2-bromo-4-p-toluidinoanthraquinone.

DAVID I. RANDALL.
EDGAR E. RENFREW.

References Cited in the file of this patent
UNITED STATES PATENTS

| Number | Name | Date |
|---|---|---|
| 2,213,188 | Fleishauer | Sept. 3, 1940 |
| 2,544,825 | Coffey et al. | Mar. 31, 1951 |

FOREIGN PATENTS

| Number | Country | Date |
|---|---|---|
| 472,652 | Great Britain | Sept. 27, 1937 |
| 613,980 | Great Britain | Dec. 7, 1948 |

OTHER REFERENCES

Stephen et al.: Chem. Ab., vol. 14, page 2338.